United States Patent [19]

Ahn

[11] Patent Number: 4,478,206
[45] Date of Patent: Oct. 23, 1984

[54] FURNACE HAVING WATER VAPOR-CONDENSING SECONDARY HEAT EXCHANGER

[75] Inventor: Hongsik Ahn, Chesterfield, Mo.

[73] Assignee: Intertherm Inc., St. Louis, Mo.

[21] Appl. No.: 568,382

[22] Filed: Jan. 5, 1984

[51] Int. Cl.³ .............................................. F24H 3/00
[52] U.S. Cl. ........................... 126/99 A; 126/110 AA; 165/178
[58] Field of Search ................ 126/99 R, 99 A, 99 C, 126/99 D, 110 R, 110 AA, 117, 109; 165/173, 175, 178, DIG. 2; 237/55

[56] References Cited

U.S. PATENT DOCUMENTS

| | | | |
|---|---|---|---|
| 2,916,032 | 12/1959 | Kitchen | 126/116 R |
| 3,627,038 | 12/1971 | Wilkins | 126/110 AA |
| 3,656,470 | 4/1972 | Goodgion | 126/110 AA |
| 3,902,473 | 9/1975 | Yeagle | 126/110 AA |
| 4,044,820 | 8/1977 | Nobles | 126/117 |
| 4,164,210 | 8/1979 | Hollowell | 126/110 R |
| 4,194,488 | 3/1980 | Bellaff | 126/112 |
| 4,241,874 | 12/1980 | Schossow | 126/117 |
| 4,256,082 | 3/1981 | Scholten | 126/110 AA |
| 4,351,276 | 8/1982 | Kremer | 237/55 |
| 4,409,955 | 10/1983 | Christian | 126/99 A |

Primary Examiner—Daniel J. O'Connor
Attorney, Agent, or Firm—Jerome A. Gross

[57] ABSTRACT

A compact secondary heat exchanger, installed above the preliminary heat exchanger in a down draft-type gas burning furnace, so greatly reduces combustion gas temperature as to recover a portion of the latent heat in the water vapor created by burning the hydrocarbon gas.

8 Claims, 1 Drawing Figure

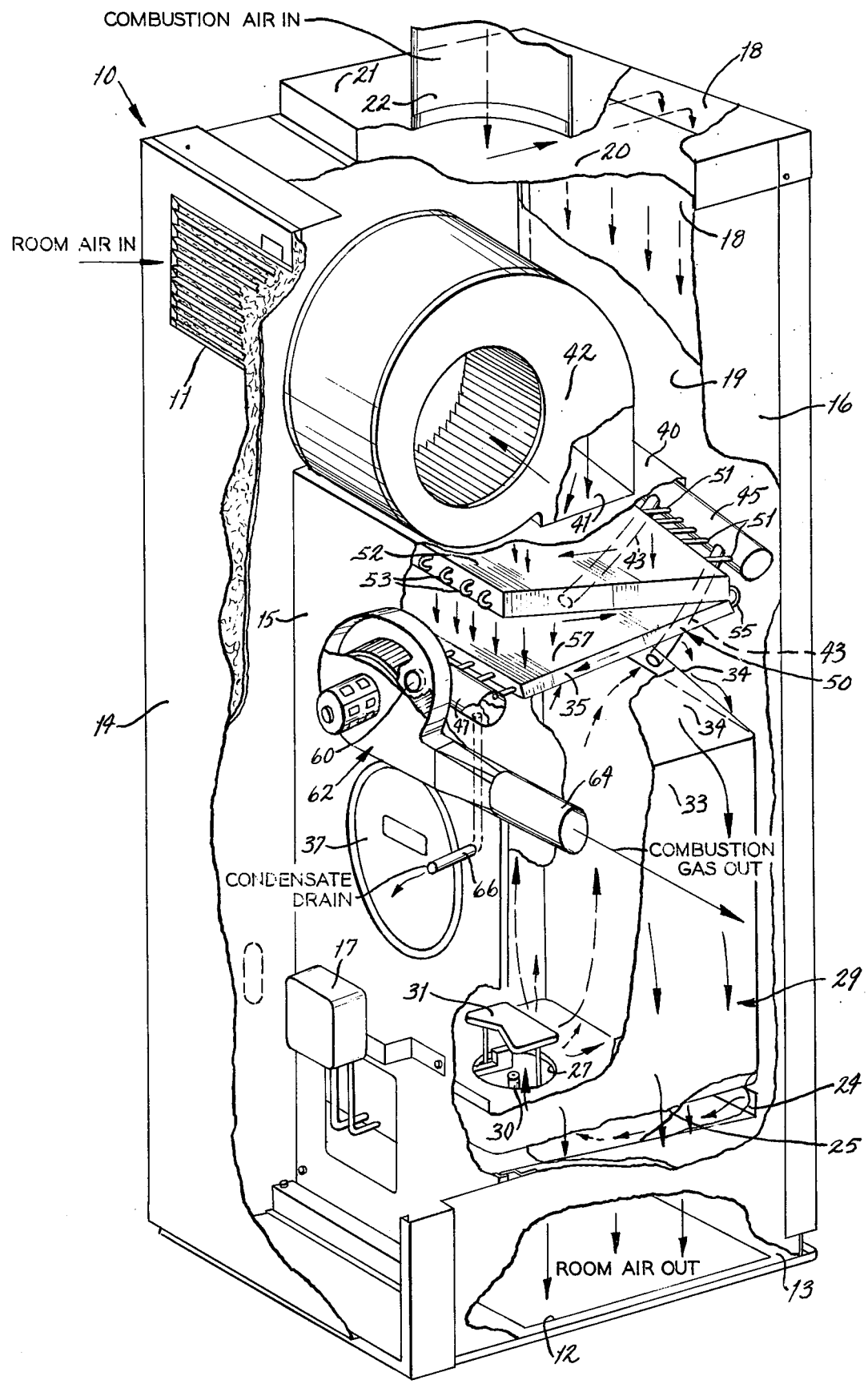

FURNACE HAVING WATER VAPOR-CONDENSING SECONDARY HEAT EXCHANGER

TECHNICAL FIELD

A secondary heat exchanger recovers much of the latent heat of water vapor in combustion gases.

BACKGROUND ART

This invention relates primarily to furnaces of the type which burn conventional hydrocarbon fuels, such as gas, or fuel oil. Such furnaces conventionally include an air casing which provides a substantially vertical path for the room air to which heat is to be exchanged, an air blower, a combustion chamber for the hydrocarbon fuel and, associated therewith, a primary heat exchanger.

The combustion gases of such fuels, usually all vented to the flue, include roughly 10% water vapor. The sensible heat of the combustion gases so vented may be somewhere in the region of 450° F. However, the water vapor includes latent heat, that is, the heat which may be realized when the water vapor is condensed.

None of the latent heat is extracted in using conventional furnaces, although its theoretical recoverability is well known.

DISCLOSURE OF THE INVENTION

One purpose of the present invention is to provide a water vapor-condensing heat exchanger which may be interposed in the space available in the vertical air path of such a conventional furnace, to recover not merely a far greater part of the sensible heat from the combustion gases but also the substantial part of the latent heat. A further purpose is to effect the condensation of water vapor in a heat exchanger of the tube type without so clogging its tubes with condensate as to interfere seriously with the passage of the combustion gases therethrough. A still further purpose is to effect a saving of space, as well as cost of manufacture, by a design which permits up-slope of initial runs of tubing from a hot gas manifold, in which no condensation will occur in steady-state operation, to obtain the advantage of downslope of the subsequent tubing runs in which the combustion gas temperature is further reduced to condense a substantial part of the water vapor.

These and other purposes, apparent from the specification which follows, are achieved in the present invention in substantially the following manner:

While a water vapor condensing heat exchanger, of the type to be described, may in some instances be used as the sole heat exchanger, it is effectively utilized in the present preferred embodiment of the invention by installation in a conventional furnace as a secondary heat exchanger.

Such a conventional furnace may have a cabinet or casing which provides a vertical path for room air downward from an intake blower, through the casing and past a primary heat exchanger (for example, the surface of a combustion chamber for hydrocarbon fuel) and then to a lower room air outlet. The present compact secondary heat exchanger may be installed in the vertical air path above the primary heat exchanger.

Combustion gases, still far above their dew point as they emerge from the primary heat exchanger, pass to a hot gas manifold extending horizontally along one side of the vertical path of the air to which heat is to be exchanged. A collector manifold is supported parallel to the hot gas manifold at the opposite side of the air path at a lower level. Extending from the hot gas manifold across the air path is a first set of heat exchange tubes, which slope upward from the hot gas manifold, and are connected by 180° tube bends to a second, reverse set of heat exchange tubes beneath the first set, which thus extend slopingly downward across the air path. In the preferred embodiment, the outlet ends of the second set of tubes are connected to a third set of tubes extending slopingly downward across to the opposite side of the air path, to connect to the collector manifold.

For compactness, as well as lowered cost, the first and second sets of tubes are incorporated by common sets of fins into a first heat exchanger element, whereas the third set of tubes is finned separately, as a second heat exchanger element. In both, all the fins extend vertically in the air path.

The resistance to flow of the combustion gases, through the tubing of these heat exchanger elements, is increased when condensate forms. To lessen such resistance, the collector manifold employs a blower to induce a draft to a flue, and also has a drain for the condensate.

The combination of the first and second sets of tubes in a single heat exchange element, positioned to slope upwardly from the hot gas manifold, does not impede the flow of condensate, for the following reason: after stable operating temperature of the components has been reached, the passage of combustion gases through the first set of tubes will not cool them down to dew point; that is, this will not produce substantial condensation in the first runs of tubing, and the substantial condensation will occur only in the second and third runs of tubing. In these, the downward slope is sufficient to drain the condensate to the collector manifold. If after a period of non-operation the hot gas manifold and first tubing runs are initially cool, any condensate which may form in the first tubing runs will flow back to the hot gas manifold whose temperature is then rising; and will there evaporate and merge in the combustion gases flowing through it.

The detailed structure of the preferred embodiment, and its efficiencies of operation are described hereafter.

THE DRAWINGS

FIG. 1 is a broken away, somewhat schematic perspective view of a furnace having a vapor-condensing secondary heat exchanger embodying the present invention.

BEST MODE FOR CARRYING OUT THE INVENTION

A gas-burining furnace incorporating the present invention, shown in FIG. 1, is conventional except for the handling of the combustion gases after they pass from the primary heat exchanger; only a fragmentary description of these conventional portions will necessary for understanding the present invention.

A vertical rectangular furnace cabinet generally designated 10 has in its foward wall a room air inlet grill 11; and has a room air outlet opening 12 in its frame-like base plate 13. The front panel 14 or a door in the forward wall may be removable to permit access to an inner forward wall 15 which extends across the cabinet between said walls 16 and mounts conventional controls 17 and other components hereafter referred to.

Spacedly forward of the rear cabinet wall 18 is a vertical duct wall 19 which connects with the rear edge of an inner top wall 20, which extends to the cabinet front panel 14. A horizontal combustion air inlet chamber is provided above the wall 20 by a relatively flat combustion air inlet casing 21, into which opens a combustion air inlet pipe 22. Combustion air, entering such chamber through the inlet pipe 22, flows rearwardly and thence down between the rear cabinet wall 18 and the vertical duct wall 19 to a point near the bottom of the furnace, where it flows forward, through a window 24 in the duct wall 19, into a flat chamber 25 and thence forward and up through a circular opening 27 for combustion.

The opening 27 is in the base plate 28 of a primary heat exchanger generally designated 29 hereafter described, which is supported spacedly inwardly of the inner forward wall 15, the vertical duct wall 19, and the side walls 16.

Hydrocarbon fuel gas, from the control 17, is introduced at the gas burner orifice 30 which is shown in the circular opening 27, for combustion beneath the baffle 31 within the primary heat exchanger 29. Preferably the primary heat exchanger is of conventional construction. Rising from its base plate 28 are welded steel box-like vertical wall 33, which are spacedly inward of the inner forward wall 15, duct wall 19, and side cabinet walls 16, so that room air may flow downward about them, be heated, and exit through the room air outlet 12. The upper edges of the heat exchanger walls 33 are welded to the lower edges of sloping upper walls 34 which merge spacedly below the secondary heat exchanger elements shown in the drawing. In its forward-presented side wall, a door opening, not shown, is reached through an access panel 37 in the inner forward wall 15.

Extending sealedly between the cabinet's inner forward wall 15 and its vertical duct wall 19, and between its side wall 16, is a horizontal plenum plate 40 which has an air opening 41 at the outlet of a scroll of a room air circulator blower 42. Room air flowing through the room air inlet grill 11 above the horizontal plenum plate 40 is directed downward by the blower 42 (whose electric motor is not shown) through the opening 41. The downward flow path to the primary heat exchanger 29 is hereinafter referred to as the vertical air path portion.

The parts heretofore described are conventional. However, instead of a conventional flue outlet, in the present invention communicating upward and rearward through and from the rear upper sloping wall 34 of the primary heat exchanger 29 are a plurality of flue gas risers 43 which enter into the lower wall of a hot gas manifold 45, shown to be an elongated cylindrical chamber disposed horizontally along the rear side of the vertical air path portion hereinabove referred to. At a lower level, along the forward side of the vertical air path portion, is a collector gas manifold 47, comprising a somewhat similar horizontal cylindrical chamber.

Combustion gases flow through the flue gas tubes 43 to the hot gas manifold 45 and thence to the collector gas manifold 47 through a secondary heat exchanger generally designated 50, interposed in the vertical air path portion between the room air inlet grill 11 and the primary heat exchanger 29, for further extraction of heat.

The secondary heat exchanger 50 shown consists of two heat exchanger elements, as now described. A first set of heat exchanger tubes 51 lead from the forward side wall of the hot gas manifold 45, at an upward slope, through a plurality of transverse vertical fins 52 hereinafter referred to as the double depth fins. Emerging from the fins at the forward side, the tubes 51 are connected by tube bends 53 to a second set of heat exchanger tubes 54 which extend parallel to the first tubes 51 through the same set of fins 52, emerging at the rear side in a similar set of bends 55, which lead downward to enter a third set of heat exchange tubes 56; these lead slopingly downward through a second set of transverse fins 57 and emerge at the forward side of the vertical air path, there to enter the upper side wall of the collector gas manifold 47. The first and second sets of heat exchanger tubes 51 and 54, finned by the common heat exchange fins 52, make up a heat exchange unit substantially similar to the construction ordinarily used for refrigeration heat exchangers. The lower heat exchange unit, made up by the third set of heat exchanger tubes 56 and the fins 57, may likewise be substantially conventional in its construction, but not in its orientation or use.

An outlet opening 60 in the forward surface of the collector gas manifold 47 leads into an induced gas blower generally designated 62 which drives air through its scroll to induce inflow of combustion gases and condensate therein from the heat exchange units into the collector gas manifold 47, and thence to impel the combustion gases out sidewardly through a combustion exhaust vent 64, to be connected to a gas vent pipe not shown.

Leading from the lower wall of the collector gas manifold 47 is a condensate drain pipe 66, which extends outward from the furnace to an appropriate drain.

The operation of the secondary heat exchanger, in the environment described, is substantially as follows: Combustion gases, exiting from the upper portion of the primary heat exchanger 29 through the tubes 43, will ordinarily then be of a temperature of about 450° F. These gases would ordinarily be ducted to the outside air, wasting their heat, including the latent heat in the water vapor created by combustion of the hydrocarbon gas.

With the construction described, the combustion gases, rising through the flue gas tubes 43, enter the hot gas manifold 45 and flow from it into the upward sloping first set of heat exchanger tubes 51. If the furnace has not operated long enough to heat the hot gas manifold 45, some condensation of water may occur in the first set of tubes 41, but any small amount then formed will flow back downward into the hot gas manifold 45, now rapidly heating, and will again be evaporated; so that in normal operation, no appreciable condensation will occur in the first set 51 of heat exchanger tubes. As the gas flows beyond the first set of bends 52, cooling thereafter in the downward sloping second set of heat exchanger tubes 54 reduces the temperature of the combustion gases down approximately to or below their dew point; the down slope from the first set of bends 53 to the second set of bends 55 is necessary to drain such condensate so that it will not clog the heat exchange tubes and thereby interfere with the outflow of the combustion gas.

After passing the second set of bends 55, on further downflow through the third set of tubes 56, the amount of condensate in the flue gas continues to increase as the gas temperature drops. As the flue gas reaches the collector gas manifold 47, the temperature of the gas will have been reduced almost to room temperature, for example, to approximately 120° F. Aided by the induced gas blower 62, the condensate drains into the collector gas manifold 47 and thence downward through the drain pipe 66 to an external drain.

The upward slope of the tubes 51 is therefore no disadvantage; to the contrary it effects space saving and cost saving; it permits the incorporation of the first set of tubes 51 and the second set of tubes 54 as part of the same heat exchanger unit and minimizes the height required, for interposition of the two heat exchanger unit described in the vertical air path portion above the primary heat exchanger 29.

Test demonstrate that the present invention provides the capability of reducing combustion gas temperature from about 450° F., to or even below 120° F. Positioning the described elements which make up the secondary heat exchanger 50, across that vertical air path portion which is cooled by the room temperature air, before it reaches the primary heat exchanger 29, is highly effective. The use of three runs of tubing, with the first and second incorporated within the same fins 52, minimizes the depth required along the vertical air path portion, and this minimization is further served by locating the collector gas manifold 47 on the side of the furnace opposite to the hot gas manifold 45.

Efficiencies in operation have been demonstrated to be approximately as follows: Using such a primary heat exchanger only, the heat recovery will usually be about 75%. The secondary heat exchanger increases the recovery of sensible heat to roughly 90% and further salvages much of the latent heat of the water vapor by condensing it, resulting in an additional heat recovery of about 5%, or a total heat recovery of approximately 95%.

It had not heretofore been thought possible to obtain such increase in efficiency without the use of large, expensive heat exchange components. The present system is so compact and so relatively inexpensive as to permit its use within a standard size furnace cabinet, with minimum added expense.

From this disclosure variations will occur to those skilled in the art.

The embodiments of the invention in which an exclusive property or privilege is claimed as defined as follows:

1. For use in a furnace of the type which burns fuel yielding water vapor as a product of combustion, and including a cashing having a substantially vertical path portion for air to which heat is to be exchanged, a water vapor-condensing heat exchanger comprising a hot gas manifold extending substantially horizontally along one side of such vertical path portion, a collector manifold extending substantially parallel thereto along a side of such path portion at a lower elevation, a first set of finned heat exchange tubes having inlet ends connected to and extending perpendicular to and at an upward slope from the hot gas manifold and across such air path portion, a second set of finned heat exchange tubes connected in flow communication with said first set and extending slopingly downward substantially parallel thereto and reversingly across such air path portion to outlet ends at a lower level than said inlet ends of the first set of heat exchanger tubes, downflow means connecting the outlet ends of said second set of tubes to said collector manifold, and means to bent combustion gases from said collector manifold and to permit the drain of condensate therefrom, whereby hot combustion gases passing from said hot gas manifold into said first set of heat exchanger tubes are partly cooled therein without producing substantial condensate and whereby further cooling of such gases on flow through said second set of heat exchanger tubes and thence through said downflow means to the collector manifold produces condensate which drains to and thence out of the collector manifold.

2. A water vapor-condensing heat exchanger as defined in claim 1, wherein said first and second set of tubes have common heat exchange fins, whereby they are comprised into a single heat exchange element.

3. A heat exchanger as defined in claim 1, wherein the collector manifold is at the side of such air path portion opposite to the hot gas manifold, and the downflow means connecting the outlet ends of said second set of tubes to the collector manifold comprises a third set of finned tubes extending slopingly downward from said outlet ends of said second set of tubes, and across such air path portion to enter the collector manifold.

4. A water vapor-condensing heat exchanger as defined in claim 1, together with means to induce combustion gas outflow from the collector manifold.

5. A water vapor-condensing heat exchanger as defined in claim 4, wherein said means to induce combustion gas outflow comprises blower means so associated with the collector manifold as to induce a draft therefrom.

6. A high-efficiency furnace burning hydrocarbon fuel, comprising an air casing providing a path for air to which heat is to be exchanged and including a substantially vertical path portion, and having, at or beyond the ends of such vertical path portion, an air-circulating blower, room air inlet means and room air outlet means, a combustion chamber including means to provide hydrocarbon fuel thereto, primary heat exchanger means associated with said combustion chamber and in the said air path portion, and a water vapor-condensing secondary heat exchanger interposed in such air path portion between the room air inlet means and the primary heat exchanger, said secondary heat exchanger comprising a hot gas manifold extending substantially horizontally along one side of such vertical path portion, a collector manifold extending substantially parallel thereto along a side of such path portion at a lower elevation, a first set of heat exchange tubes having inlet ends connected to and extending perpendicular to and at an upward slope from the hot gas manifold and across such air path portion, a second set of heat exchange tubes connected in flow communication with said first set and extending sloping downward substantially parallel thereto and reversingly across such air path portion to outlet ends at a lower level than said inlet ends of the first set of heat exchanger tubes, downflow means connecting the outlet ends of said second set of tubes to said collector manifold, means to vent combustion gases from said collector manifold to permit the drain of condensate therefrom, and means to induce combustion gas outflow from the collector manifold.

7. A high-efficiency furnace as defined in claim 6, wherein the collector manifold is at the side of such air path portion opposite to the hot gas manifold, and the downflow means connecting the outlet ends of said second set of tubes to the collector manifold comprises a third set of finned tubes extending slopingly downward from said outlet ends of said second set of tubes, and across such air path portion to enter the collector manifold.

8. A high-efficiency furnace as defined in claim 6, wherein said means to induce combustion gas outflow comprises blower means so associated with the collector manifold as to induce a draft therefrom.

* * * * *

UNITED STATES PATENT AND TRADEMARK OFFICE
CERTIFICATE OF CORRECTION

PATENT NO. : 4,478,206
DATED : October 23, 1984
INVENTOR(S) : Hongsik Ahn

It is certified that error appears in the above-identified patent and that said Letters Patent is hereby corrected as shown below:

Col. 2, line 57, "burining" should be ---burning---.

Col. 3, line 1, "said" should be ---side---.

Col. 3, line 28, "wall" should be ---walls---.

Col. 5, line 13, "Test" should be ---Tests---.

Col. 5, line 47, "cashing" should be ---casing---.

Col. 5, line 63, "bent" should be ---vent---.

Col. 6, line 47, "sloping" should be ---slopingly---.

Signed and Sealed this

Sixteenth Day of April 1985

[SEAL]

Attest:

DONALD J. QUIGG

Attesting Officer  Acting Commissioner of Patents and Trademarks